United States Patent [19]
Walter

[11] Patent Number: 5,171,624
[45] Date of Patent: Dec. 15, 1992

[54] RETROREFLECTIVE MICROPRISMATIC MATERIAL AND METHOD OF MAKING SAME

[75] Inventor: Helmut Walter, Rungsted Kyst, Denmark

[73] Assignee: Reflexite Corporation, New Britain, Conn.

[21] Appl. No.: 532,069

[22] Filed: Jun. 1, 1990

[51] Int. Cl.⁵ .................. B32B 5/00; G02B 5/122
[52] U.S. Cl. .................. 428/156; 428/161; 428/167; 428/172; 428/212; 428/913; 359/530; 359/534; 359/535; 359/537; 359/542; 359/546; 359/584
[58] Field of Search .......... 428/161, 156, 172, 167, 428/178, 913, 162, 119, 120, 141, 192, 212, 332, 337, 542.2; 359/584, 530, 534, 535, 537, 542, 546

[56] References Cited

U.S. PATENT DOCUMENTS

| | | | |
|---|---|---|---|
| 1,671,086 | 5/1928 | Stimson | 362/327 |
| 1,743,834 | 1/1930 | Stimson | 362/327 |
| 1,743,835 | 1/1930 | Stimson | 362/327 |
| 3,541,606 | 11/1970 | Heenan et al. | 350/103 |
| 3,689,346 | 9/1972 | Rowland | 150/245 |
| 3,923,378 | 12/1975 | Heenan | 350/103 |
| 4,066,331 | 1/1978 | Lindner | 350/103 |
| 4,349,598 | 9/1982 | White | 428/161 |
| 4,588,258 | 5/1986 | Hoopman | 350/103 |
| 4,775,219 | 10/1988 | Appeldorn et al. | 350/103 |
| 4,938,563 | 7/1990 | Nelson et al. | 350/103 |

Primary Examiner—Donald J. Loney

[57] ABSTRACT

A microprism retroreflector material has a body portion with a planar front face and closely spaced microprisms extending thereacross in a plane spaced from and parallel to the front face. The microprisms are formed with three side surfaces disposed along three intersecting planes, and at least some of the microprisms have at least one side surface which is arcuate along one of the intersecting planes and over at least the major portion of its height. At least some adjacent pairs of microprisms have their prism axes tilted relative to the intersecting plane extending therebetween. The microprisms retroreflect light in six circumferentially spaced radially extending exit-energy patterns, and at least 70 percent of the retroreflected light is within a spread of not more than 0.6° from the light rays impinging thereon.

12 Claims, 4 Drawing Sheets

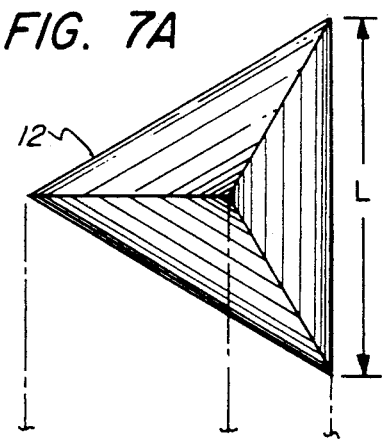
FIG. 7A
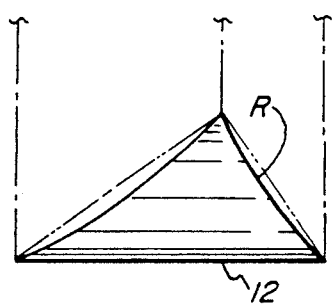
FIG. 7B
FIG. 8
17.44 mRAD.
8.72 mRAD.
8.72 mRAD.
FIG. 9
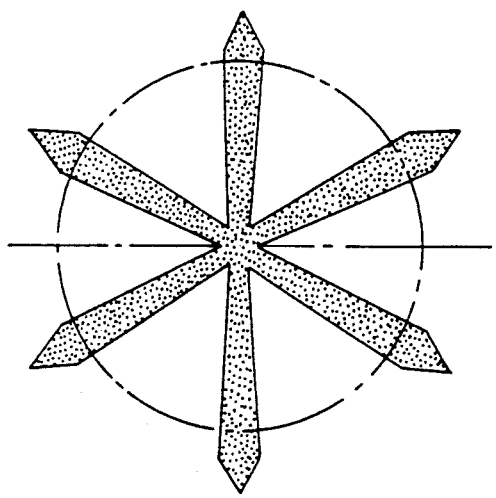
FIG. 10A
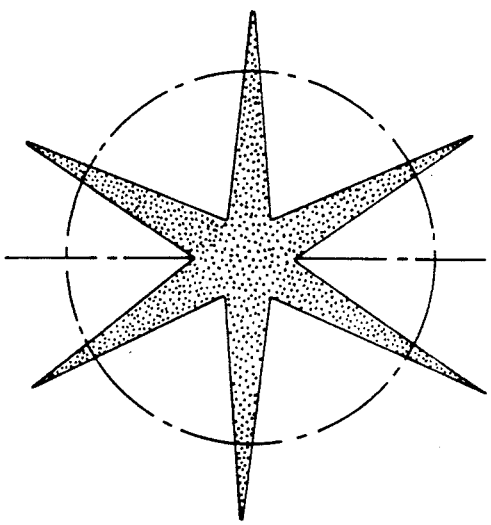
FIG. 10B

RETROREFLECTIVE MICROPRISMATIC MATERIAL AND METHOD OF MAKING SAME

BACKGROUND OF THE INVENTION

The present invention relates to retroreflective sheeting employing microprism formations to retroreflect the light rays impinging thereon, and, more particularly, to such sheeting which is effective to provide retroreflection of light in a slightly divergent pattern to provide a concentration of the light within a relatively narrow viewing angle.

Retroreflective sheet material is widely employed for a variety of safety and decorative purposes, and is particularly useful when the need for night time visibility is significant under conditions of low ambient light. In retroreflective materials, the light rays impinging upon the front surface are reflected back towards the source of the illumination. In situations where headlights or search lights on boats and aircraft are the only source of illumination, this ability to retroreflect in a controlled cone the bulk of the rays falling thereon is especially significant for warning signs, delineators and the like.

Minnesota Mining and Manufacturing Corporation has manufactured retroreflective sheeting utilizing minute glass beads embedded in a matrix of synthetic resin to provide such retroreflection, and these materials have been sold under the trademark SCOTCHLITE. Illustrative of such materials is Bergeson et al. U.S. Letters Pat. No. 4,637,950 granted Jan. 20, 1987.

Applicant's assignee, Reflexite Corporation, has been marketing under the trademark REFLEXITE, reflective sheeting employing microprisms formations to produce such retroreflection. Illustrative of such materials is Rowland U.S. Letters Pat. No. 3,689,346 granted Sep. 5, 1972.

Among the applications for such retroreflective materials are reflective tapes and patches for clothing of firemen, reflective vests and belts, bands for posts and barrels, traffic cone collars, highway signs, warning reflectors, and the like.

Well made cube corner formations are known to be highly effective retroreflectors, but they tend to concentrate the reflected light in a very narrow zone directed to the originating light source. For highway and other applications, controlled divergence of the light rays within a narrow cone of 0.2°–2.0° is considered desirable to increase the angle over which the illuminated reflecting surface may be seen by drivers, pedestrians and the like who are displaced from the light source.

Efforts to increase the viewing angle are described in the prior art, and a review of some of the prior art is set forth in the initial portion of the specification of Hoopman U.S. Pat. No. 4,588,258, Hoopman describes the benefit of tilting the optical axes of adjacent prisms towards each other. Such tilting and the benefits thereof are also described in the earlier Heenan U.S. Pat. Nos. 3,541,606, and U.S. Pat. No. 3,923,378, Lindner U.S. Pat. No. 4,066,331, and White U.S. Pat. No 4,349,598.

Appledorn et al U.S. Pat. No. 4,775,219 describes improved divergence profiles obtained by repeating sub-arrays of prisms of distinctive shapes.

Stimson U.S. Pat. No. 1,671,086, U.S. Pat. No. 1,743,834 and U.S. Pat. No. 1,743,835 describe macro prism retroreflectors with faces which are arcuate to effect a controlled spread of the reflected light rays.

It is an object of the present invention to provide a novel microprism retroreflective sheeting which provides a desirable, controlled spread of the reflected light for good visibility over a 0.5° viewing angle.

It is also an object of the present invention to provide such a retroreflective sheet material which may be readily fabricated and which has a high degree of brilliance.

Another object of the present invention is to provide methods for fabricating such retroreflective sheet material which are relatively simple and relatively economical, and which produce long-lived materials.

SUMMARY OF THE INVENTION

It has now been found that the foregoing and related objects may be readily attained in a microprism retroreflector material having a body portion with a planar front face and closely spaced microprisms extending thereacross in a plane spaced from and parallel to the front face. The microprisms have a spacing between their apices of 0.006–0.025 inch, and each is formed with three side surfaces disposed along three intersecting planes.

At least some of the microprisms have at least one side surface which is arcuate along one of the intersecting planes and over at least the major portion of its height, the ratio of the length of the radius defining the arc to the length of the base of the side surface being 40–90:1 and effecting a divergence of reflected light of 17–25 milliradians. At least some adjacent pairs of microprisms have their prism axes tilted 3–10° relative to the intersecting plane extending therebetween, and the intersections of the three surfaces define included angles of 89.8–90.2°. The microprisms retroreflect light in six circumferentially spaced radially extending exit-energy patterns, and at least 70 per cent of the retroreflected light is within a spread of not more than 0.6° from the light rays impinging thereon.

Preferably, all side faces of the microprisms are arcuate along their respective planes, and the arcuate faces are concavely arcuate.

Most desirably, the arcuate portion extends over substantially the entire height of the microprisms, and the microprisms are tilted away from each other. The microprisms have a center to center spacing of 0.007–0.15 inch and define included angles of 89.9–90.1°, with the angle of tilt being 6–8°.

In the method for producing microprism retroreflector material, a mold is formed with closely spaced microprism cavities therein, each with three side surfaces oriented along three intersecting planes, and the spacing between the nadirs of the cavities being 0.006–0.025 inch. At least one side surface of each cavity is arcuate along one of the planes defining it and over at least the major portion of its depth, and the ratio of the length of the radius defining the arc to the top edge of that side surface to the cavity is 40–90:1. At least some adjacent pairs of cavities have their vertical axes tilted 3–10° relative to the intersecting plane extending therebetween, and the intersections of the three surfaces define included angles of 89.8–90.2°.

Synthetic resin is formed on the mold to fill the cavities to form microprisms therein and to provide a continuous body portion across the surface of the mold. The body portion has one surface from which the microprisms project and its opposite surface substantially planar to provide a microprism retroreflector material.

The synthetic resin microprism structure formed on the mold is then removed therefrom.

In the preferred process, the forming step involves deposition of a fluid resin formulation in the cavities, applying synthetic resin sheeting thereover, and allowing the resin formulation to harden and bond to the sheeting.

BRIEF DESCRIPTION OF THE DRAWINGS

FIG. 7a and 7b are partially diagrammatic views of a microprism formation with concavely arcuate faces and showing in phantom line the exaggerated curvature;

FIG. 8 is the single lobe of the retroreflected energy pattern of an arcuate prism face seen in FIG. 7, the prism not being tilted;

FIG. 9 is the single lobe of the retroreflected energy pattern of the arcuate prism face if the arcuate prism is also tilted about the prism axis;

FIGS. 10a and 10b to that of the entering ray

DETAILED DESCRIPTION OF PREFERRED EMBODIMENT OF THE INVENTION

As previously indicated, the sheeting of the present invention employs closely spaced microprisms which have one or more of their faces formed with a relatively shallow curvature, and in which adjacent pairs have their optical axes tilted relative to each other. In addition, the planes of the faces intersect at angles which deviate only slightly from 90°. As a result, the prisms of the sheeting combine the effects of three separate principles of light energy redirection to produce retroreflection of most of the light entering the prisms within a narrow cone of about 0.5° divergence and in a manner which minimizes the regions of low power within that cone.

The term "sheeting" as used herein refers to relatively thin sheet-like structures as well as thicker members, laminates and the like, which have a substantially planar front face upon which light rays impinge and which have a body portion which is essentially transparent to the light rays.

To understand the several effects and their contribution to the desired result, it is advantageous to consider first the operation of a microprism sheeting with perfectly formed cube corner prisms, i.e., those having three faces which intersect at 90° angles, and which have their optical axes and prism axes coincident, i.e., perpendicular to the front face of the sheeting.

Figure 1:
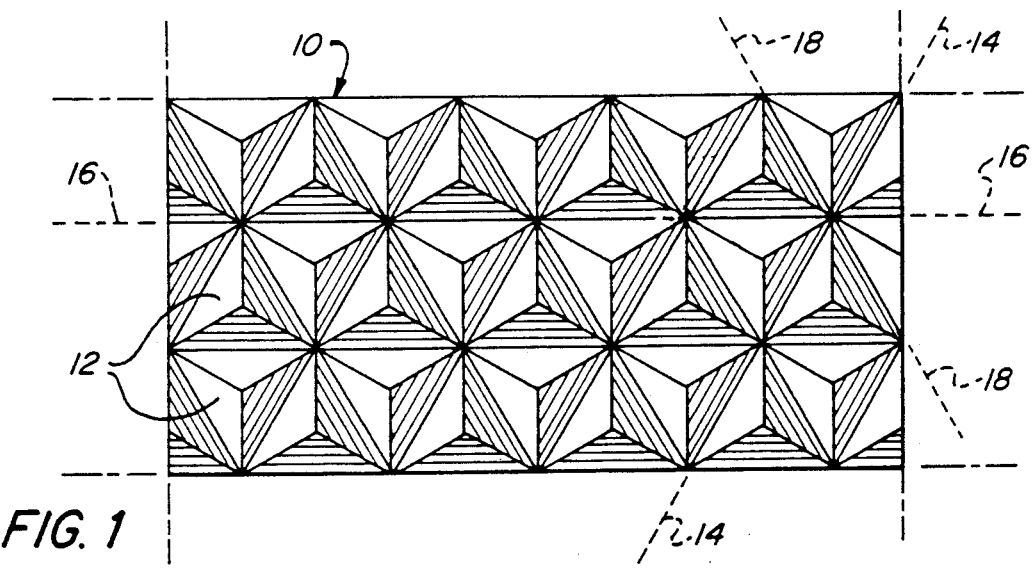
FIG. 1 is a fragmentary plan view of the prism formations of a conventional retroreflective materials using orthogonal prisms formed by ruling a mold along three axes disposed at 60° spacing and defining the three inclined faces of the prisms.

As seen in FIG. 1, such microprism sheeting is designated by the numeral 10 and has closely shaped microprisms 12 with planar surfaces formed by rulings extending in three intersecting planes 14, 16 and 18 which are spaced 60° apart. Most conveniently, such cube corner arrays can be ruled with a diamond tool with linear cutting edges at an angle of 70.529° to each other as a set of three grooves intersecting 60° to each other.

Figure 2:
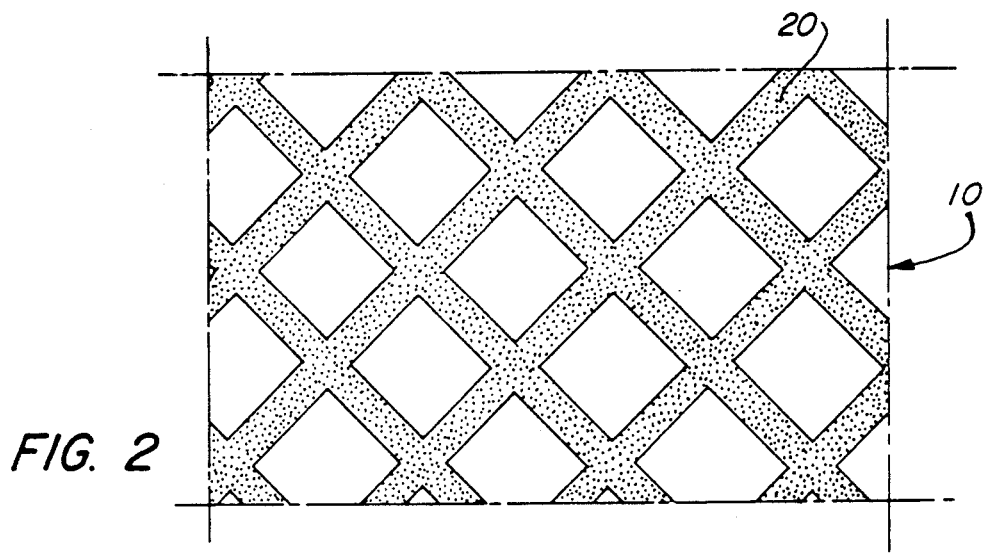
FIG. 2 is a fragmentary plan view showing a typical grid pattern of adhesive used for bonding the retroreflective material to a substrate.
Figure 3:
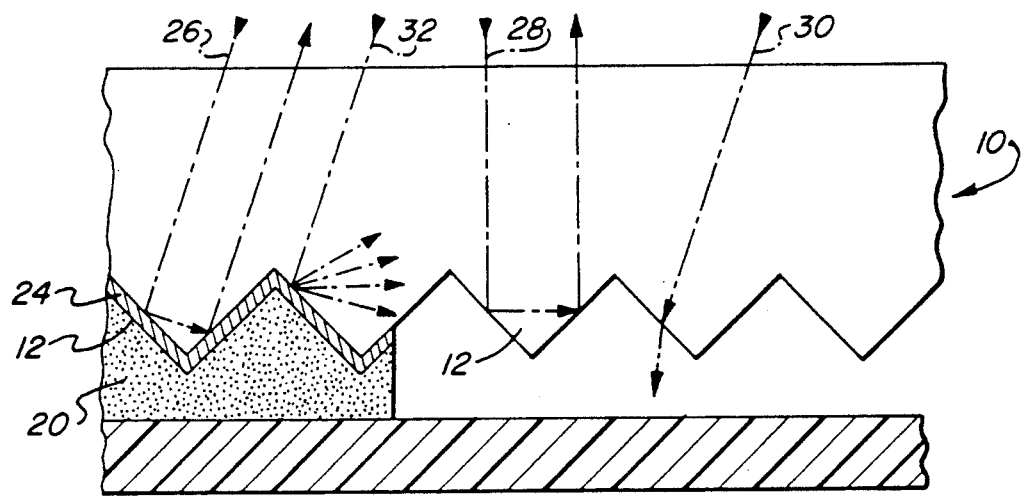
FIG. 3 is a fragmentary sectional view showing a partially metallized and partially air backed material showing diagrammatically the path of typical light rays incident thereon.

In FIG. 2, there is illustrated an adhesive 20 conveniently applied in a grid pattern and used to secure the microprism sheeting 10 to a backing material 22 seen in FIG. 3.

As is known, the three reflecting adjacent surfaces of a cube corner rotate the direction of the incoming light 180° and the light exits parallel to the incident direction. Retroreflection of light rays entering the prisms may be seen in FIG. 3 wherein a reflective metal deposit 24 is shown on some of the prisms 12 while an air interface is shown for other prisms 12. A light ray 26 entering the front face of the sheeting 10 and entering the prism 12 is reflected by the interface of the prism material with the metallic coating 24 to another face of the prism (and again reflected to the third face of the prism, although not so illustrated), and ultimately redirected from the prism 12 towards the front face of the sheeting 10 from which it exits in a path substantially parallel are computer generated graphic representations of the "classic" six lobed energy distribution output of a retroreflector prism cavity, FIGS. 8 and 9 showing only one of these six lobes towards the original source. Similarly, the light ray 28 is redirected by the air interfaces of the prism into which it passes. A light ray 30 entering the sheeting 10 at a steep angle will not be reflected by the air interface. A light ray 32 impinging upon the prism adjacent its base will, in its reflecting path, only strike two of the prism faces and miss the third face. As a result, it will not be retroreflected.

If the effective area of each single cube corner, which is represented by a hexagonal shape, is large enough in size, it will not diffract significant energy. All the light is directed back to the source and the retroreflector would not be useful to provide conspicuity in traffic applications due to the angular separation of light source and viewer in a car.

For such applications, it is desirable to spread the light beam into an exit cone of approximately 0.5°. One can choose the size of the cube corner and use the energy of the first order of diffraction to fall into the exit cone of 0.5°. The divergence of the first order energy from a round aperture is equal to $$\text{Divergence} = 1.2_d^\lambda \text{ [rad]}$$

$\lambda =$ wave length of light
$d =$ diameter of aperture

The hexagonal aperture of the cube corner in an array has approximately the same divergence, but the energy of the first order of diffraction is concentrated in six spots located 60° apart. While the energy cones of the first order of diffraction may be chosen to fall within the desired exit cone of 0.5° by selection of ruling spacing and resultant aperture size, there are areas within the 0.5° cone of returned energy with significantly reduced energy level.

Figure 4:
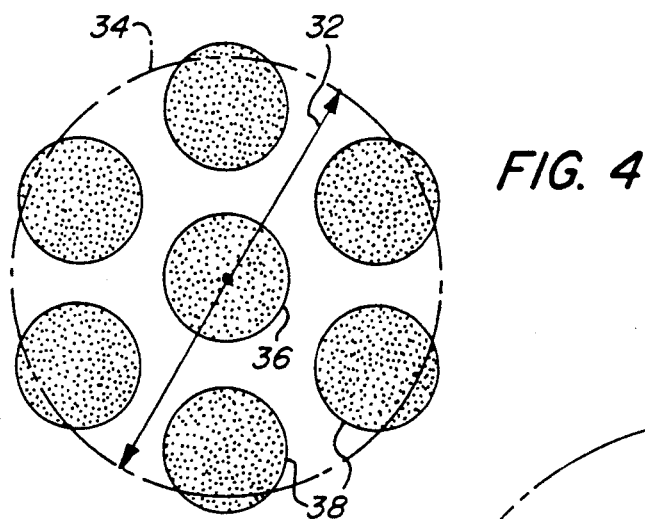
FIG. 4 is a typical retroreflected energy pattern generated by the microprism material of FIGS. 1-3 when the prisms are about 0.006 inch on centers.

Turning now to FIG. 4, therein illustrated is the effect of diffraction on the exit energy pattern in a microprism sheeting in which the prisms are 0.006 inch on centers. The center of the energy pattern is designated by the numeral 32 and the circumference of the 0.5° exit cone is designated by the numeral 34. The exit energy is concentrated in the 0-order center portion 36 and in the six radially and circumferentially spaced areas 38 with an area of low energy level therebetween. This energy distribution is not desirable because of the high degree of variation in energy level throughout the 0.5° cone.

Figure 5:
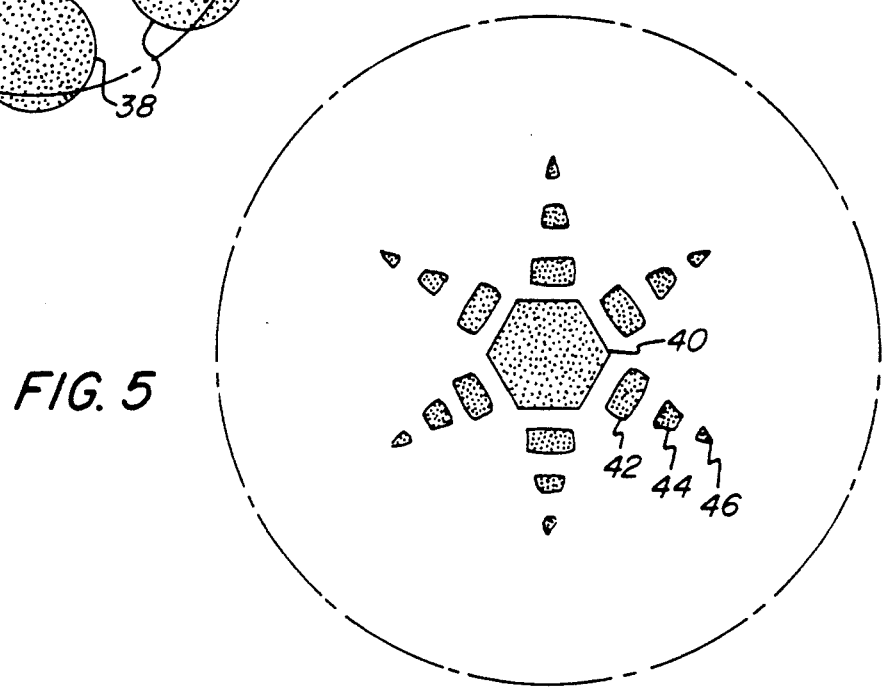
FIG. 5 is a typical retroreflected energy pattern generated by such microprism material when the prisms are about 0.014 inch on centers.

In FIG. 5 is the type of retroreflected energy patterns generated by such microprism sheeting wherein the microprisms are 0.014 inch on centers so as to minimize the effect of diffraction. Here the energy is concentrated in the zero order center spot 40 surrounded by first, second and higher order diffraction patterns 42, 44 and 46 respectively. The main portion of the retroreflected energy is concentrated in a narrow cone. Obviously, this is not a desirable pattern of energy distribution.

Figure 6:
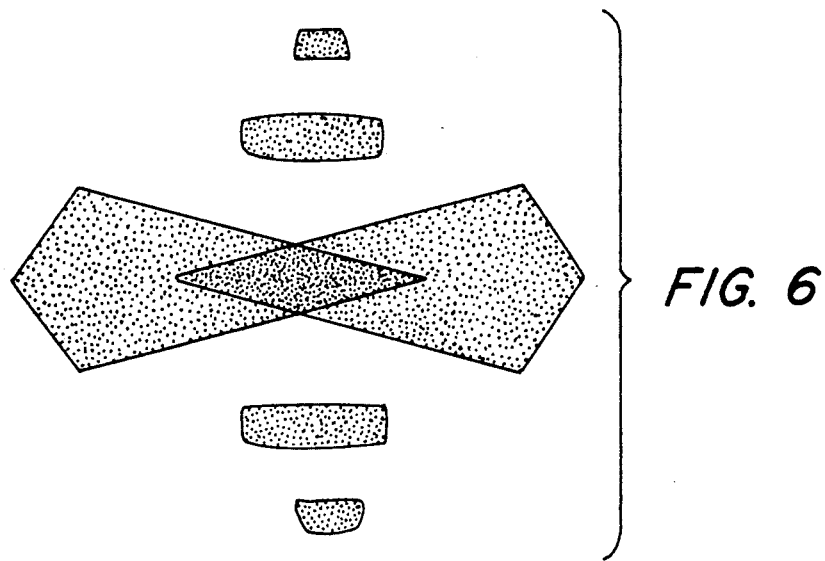
FIG. 6 is a typical retroreflected energy pattern generated by 0.014 inch prism material when pairs of prisms are tipped toward each other.

If the microprisms of this sheeting are tilted in group S, a more non-uniform reflected energy pattern is generated, as is diagrammatically illustrated in FIG. 6.

As was recognized by Stimson in the aforementioned patents, providing arcuate surfaces on the side faces of the prisms affords the opportunity to spread the retroreflected light in a controllable manner. However, the radius R employed to do so must be very large relative to the base length L of the prism face.

As seen in FIG. 7, the faces of the prism 12 are concavely arcuate along the plane defining the face, i.e., the surface is cylindrical with the axis of the cylinder extending in the plane of the ruling.

One lobe of the retroreflected energy generated by such an arcuate faced prism is seen in FIG. 8. The arcuate surface is generated by use of a radius (R) having a ratio of 87.5:1 relative to the length of the side of the prism (L). It may be calculated as having a radial length of 17.44 milliradians.

FIG. 8 shows one lobe of the calculated retroreflected energy if absolute orthogonality is maintained at the tip of the prism. A defined minimal departure from orthogonality (up to 0.2°) will produce a calculated lobe as shown in FIG. 9, and the pattern is spread to an approximately equal distance on opposite sides of the optical axis.

In FIGS. 10a and 10b are illustrated the effects on the retroreflected energy pattern by deviating from orthogonality, i.e., by increasing or decreasing the included angle between adjacent faces of the prism.

Figure 13:
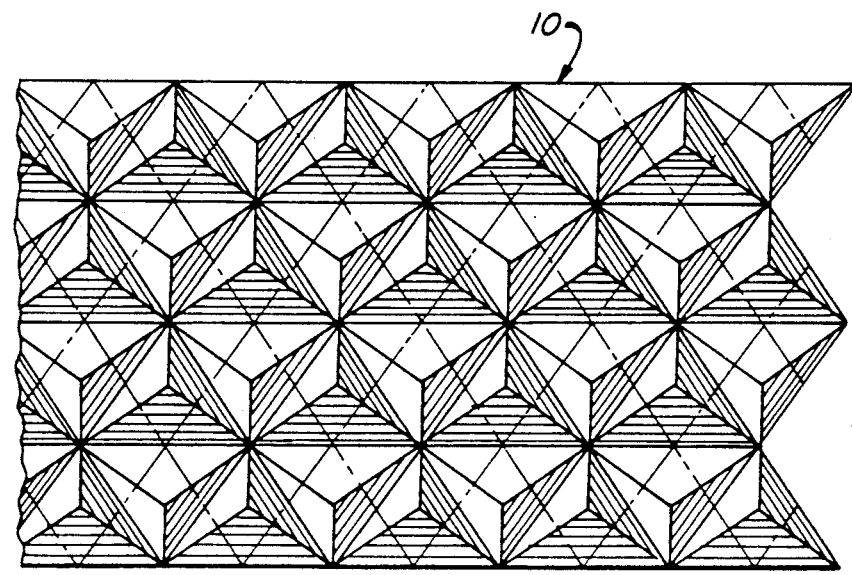
FIG. 13 is a plan view of microprism sheeting embodying the present invention in which the prism faces are concavely arcuate as seen in FIG. 7 and adjacent pairs are tipped towards each other.

By providing sheeting in which the microprisms faces are both arcuate and are in tilted pairs as seen in FIG. 13, the effect of the alternating tilt is to provide an aperture which does not have a symmetric center (two symmetrical axes perpendicular to each other) and therefore it reduces the energy dispersed into the first order of diffraction. A second effect is to provide a broader coverage of entry angle performance.

Figure 11:
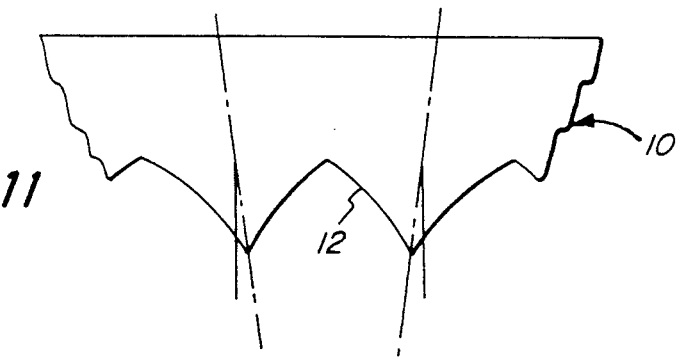
FIG. 11 diagrammatically illustrates the tilting and curvature of the prisms of the sheeting of FIG. 13.
Figure 12:
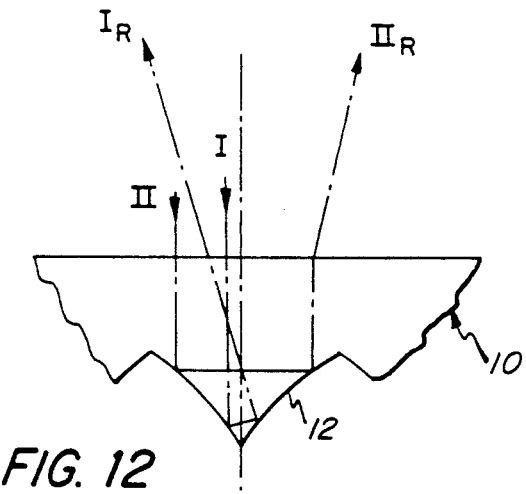
FIG. 12 diagrammatically illustrates the paths of light rays entering the prisms of the sheeting of FIG. 13.

A pair of adjacent cube corners, one tilted to the right and the other to the left have a smaller combined effective area than untilted cube corners at 0° entrance angle. With increasing entrance angle, one cube corner will gain in effective area for a given angle of tilt and therefore broaden the energy distribution. The effects of this tilting can be seen in FIGS. 11 and 12, and the resultant calculated retroreflected energy pattern is seen in FIG. 14.

The combination of properly chosen cube corner size and geometry (limited non-orthogonality), arcuate faces and tilted optical axes for pairs of adjacent cube corners provides the following advantages:

1. radial control over six exit-energy patterns.
2. relative insensitivity in performance due to deviations in the angular relationship of the three adjacent cube surfaces.
3. reduced energy obeying the law of diffraction causing light to go into unwanted directions.
4. broadening the entrance angle performance in one orientation.

Figure 14:
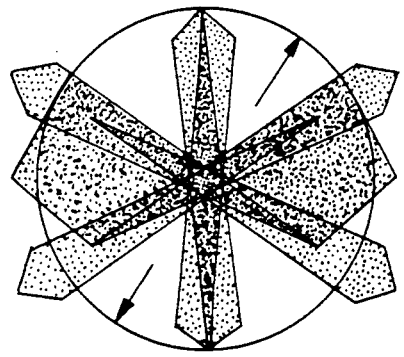
FIG. 14 is the retroreflected energy pattern of the sheeting of FIG. 13.

The reflected energy pattern of the sheeting of the present invention is diagrammatically illustrated in FIG. 14.

The present invention is applicable to microprism sheeting in which the center to center spacing of the prisms is 0.006–0.025 inch, and preferably 0.007–0.015 inch. As will be appreciated, the height of the prisms will be dictated by the center to center spacing since the prisms are effectively orthogonal.

The prism faces are desirably all provided with the arcuate configuration although providing such configuration on only one or two faces will produce a lesser beneficial result albeit with lesser uniformity.

To achieve desirable results, it has been determined that the ratio of the radius of the arcuate surface to the length of the base of the face should be 40–90:1, and preferably 80–90:1. The arcuate surface is preferably concave but it may also be convex.

The tilt angle (angle between the prism axis and optical axis) should be within the range of 3–10°, and is preferably 6–8°.

Lastly, some non-orthogonality in the intersections of the prism faces is effected, but it must be limited to a deviation of 0.2° and is preferably about 0.1°.

The body portion of the sheeting will generally have a thickness sufficient to provide structural integrity for the sheeting, i.e., at least 0.004 inch. Generally, it will fall within the range of 0.008–0.1 inch If so desired, it may comprise a laminate of two or more layers depending upon the method of fabrication, the resins selected, and other characteristics desired for the retroreflective sheeting.

The microprism sheeting is conveniently formed by casting prisms upon a film surface functioning as the body, or by embossing a preformed sheeting, or by casting both body and prisms concurrently. Generally, the resins employed for such cast microprism sheeting are cross-linkable thermoplastic formulations, and desirably these resins provide flexibility, light stability, and good weathering characteristics. In some instances, the front face of the retroreflective sheeting may be provided with a protective coating such as by application of a lacquer or other coating material. Other suitable resins for the retroreflective sheeting include vinyl chloride polymers, polyesters, polycarbonates, methyl methacrylate polymers, polyurethanes and acrylated urethanes.

To protect a relatively thin body member during processing, a relatively thick carrier may be temporarily bonded thereto, and it will generally have a thickness of 0.005–0.008 inch. The adhesive used to effect the temporary bonding therebetween and which preferentially adheres to the carrier is conveniently a silicone adhesive applied to a thickness of about 0.00025–0.0005 inch. When ultraviolet curing of the resin in the prisms is employed, the adhesive must be transparent to the light rays. Although various resins may be employed for such a carrier, polyesters, and particularly polyethylene terephthalate, are desirably employed because of their toughness and relative resistance to processing conditions. As with the adhesive, the carrier should be transparent to the ultraviolet radiation used to effect curing. Moreover, the surface of the carrier may be treated to enhance the preferential adhesion of the adhesive to the surface of the carrier.

A particularly advantageous method for making such cast retroreflective sheeting is described and claimed in Rowland U.S. Letters Pat. No. 3,689,346 granted Sep. 5, 1972 in which the cube corner formations are cast in a cooperatively configured mold providing microprism recesses and are bonded to sheeting which is applied thereover to provide a composite structure in which the cube corner formations project from the one surface of the sheeting.

Another method for fabricating such microprism sheeting is described in Rowland U.S. Letters Pat. No. 4,244,683 granted Jan. 13, 1981 in which the cube corner formations are produced by embossing a length of sheeting in suitable embossing apparatus with molds having precisely formed microprism cavities and in a manner which effectively avoids entrapment of air.

The latter method has been used for forming sheeting of acrylic and polycarbonate resins while the former method has proven highly advantageous for forming retroreflective sheeting from polyvinyl chloride resins and, more recently, polyester body members with prisms of various resin formulations including acrylated epoxy oligomers.

It is customary to provide a backing sheet behind the microprisms so as to protect them and to provide a smooth surface for application of the structure to support surfaces. To effect lamination of such a backing sheet to the retroreflective sheeting, adhesives and ultrasonic welding have generally been employed.

As previously described, the reflective interface for the prisms may be provided by a reflective coating or by an air interface. In the preferred embodiment of the present invention, a reflective coating is provided upon the surfaces of at least some of the microprisms, and such reflective coatings have most commonly been vacuum metallized aluminum or other specular metal deposits, although metallic lacquers and other specular coating materials have also been used.

A colored coating material may be provided over some of the prisms to provide a daytime coloration. Such a material may be a colored lacquer applied to the surface of the sheeting, a colored adhesive, or any other colored deposit which will coat the prism surfaces. Conveniently, a colored adhesive is employed since this will enable bonding of the backing material thereto.

A retroreflective material utilizing some prisms which have reflective air interfaces and others which utilize a reflective coating offers some advantages and is described in detail in Martin U.S. Letters Pat. No. 4,801,193 granted Jan. 31, 1989. If so desired, retroreflective sheeting may be produced by applying the backing material to a partially metallized material so as to maintain the air interface in the uncoated areas.

To produce a sheeting which exhibits a daytime coloration, a colored coating may be applied over the entire area of a partially metallized surface so that it directly coats the unmetallized prisms. Thereafter, the backing material is applied. In an alternate colored embodiment using an air interface for retroreflection, a colored adhesive is applied in a pattern to the prism surface and to a depth greater than the height of the prisms. When the backing element is laminated thereto, it is spaced from the prisms by the adhesive and this provides an air interface about the uncoated prisms.

The backing material may be any suitable material. For flexibility, it is a woven or laid fabric, or a flexible, durable polymeric material. Suitable resins include polyethylene, polypropylene, polyurethanes, acrylated polyurethanes and ethylene/vinyl acetate copolymers. Polyester and urethane fabrics may be employed as well as those of natural fibers such as cotton. Flame retardants may be incorporated in the adhesives as well as in the fabric or resin backing to impart flame retardance to the retroreflective material.

Although other metals may be used to provide a specular metal deposit including silver, rhodium, copper, tin, zinc, and palladium, the preferred and most economical processes utilize aluminum vacuum deposition. Other deposition techniques include electroless plating, electroplating, ion deposition and sputter coating.

The step of adhering the backing to the retroreflective sheeting may simply involve passing the adhesively coated retroreflective sheeting through the nip of a pair of rolls together with the backing material to apply the necessary pressure to effect adhesion. If a heat activatable adhesive is employed, the retroreflective sheeting may be subjected to preheating prior to passage through the rolls, or the rolls may be heated to achieve the necessary activation. However, it is also practicable to employ ultrasonic welding and other techniques to bond the backing material to the retroreflective sheeting by the material of the backing material itself when it is thermoplastic.

To provide a coloration to the retroreflective light at night, a dye may be incorporated in the resin used to form the body member, and even the prisms. As an alternative to a dye and as an effective necessity in some resin systems, the coloration may be provided as a finely divided pigment which is well dispersed; however, some loss in retroreflectivety will occur as the result of refraction by pigment particles which are directly in the path of light rays.

Thus, it can be seen from the foregoing detailed description and attached drawings that the present invention provides a retroreflective microprism material which exhibits a desirably controlled spread of the retroreflected light energy within a narrow cone and which is operative to retroreflect light impinging thereon at an entrance angle which deviates from normal. The retroreflected light energy is thus concentrated and reasonably uniformly dispersed about a reasonably narrow divergent cone to facilitate viewing by persons displaced from the illuminating light source.

Having thus described the invention, what it claimed is:

1. A microprism retroreflector material having a body portion with a planar front face and closely spaced microprisms extending thereacross in a plane spaced from and parallel to said front face, said microprisms having a spacing between their apices of 0.006-0.025 inch, each of said microprisms being formed with three side surfaces disposed along three intersecting planes:

(a) at least some of said microprisms having at least one side surface which is arcuate along one of said intersecting planes and over at least the major portion of its height, the ratio of the length of the radius defining the arc to the length of the base of said one side surface being 40-90:1 and effecting a divergence of reflected light of 17-25 milliradians;

(b) at least some adjacent pairs of microprisms having their prism axes tilted 3-10° relative to the intersecting plane extending therebetween; and (c) the intersection of the three surfaces defining included angles of 89.8-90.2°, whereby said microprisms, retroreflect light in six circumferentially spaced radially extending exit-energy patterns disposed about a central zero order cone, at least 70 per cent of the retroreflected light being within a spread of not more than 0.6° from the light rays impinging thereon.

2. The microprism retroreflector material in accordance with claim 1 wherein all side faces of said microprisms are arcuate along their respective planes.

3. The microprism retroreflector material in accordance with claim 1 wherein said arcuate faces are concavely arcuate.

4. The microprism retroreflector material in accordance with claim 1 wherein said arcuate portion extends over substantially the entire height of said microprisms.

5. The microprism retroreflector material in accordance with claim 1 wherein said microprisms are tilted away from each other.

6. The microprism retroreflector material in accordance with claim 1 wherein said microprisms have a center to center spacing of about 0.007-0.015 inch.

7. The microprism retroreflector material in accordance with claim 1 wherein said included angles are 89.9°-90.1°.

8. The microprism retroreflector material in accordance with claim 1 wherein said prism axes are tilted at an angle of 6-8°.

9. A microprism retroreflector material having a body portion with a planar front face and closely spaced microprisms extending thereacross in a plane spaced from and parallel to said front face, said microprisms having a spacing between their apices of 0.006-0.25 inch, each of said microprisms being formed with three side surfaces disposed along three intersecting planes:

(a) said microprisms having side surfaces which are arcuate along their respective intersecting surfaces and over substantially the entire height thereof, the ratio of the length of the radius defining the arc to the length of the base of said surface being 40-90:1 and effecting a divergence of reflected light of 17-25 milliradians;

(b) at least some adjacent pairs of microprisms having their prism axes tilted 3-10° relative to the intersecting plane extending therebetween; and (c) the intersections of the three surfaces defining included angles of 89.9-90.1°, whereby said microprisms retroreflect light in six circumferentially spaced radially extending exit-energy patterns disposed about a central zero order cone, at least 70 per cent of the retroreflected light being within a spread of not more than 0.6° from the light rays impinging thereon.

10. The microprism retroreflector material in accordance with claim 9 wherein said arcuate faces are concavely arcuate.

11. The microprism retroreflector material in accordance with claim 9 wherein said microprisms are tilted away from each other.

12. The microprism retroreflector material in accordance with claim 9 wherein said microprisms have a center to center spacing of about 0.007-0.015 inch and said prism axes are tilted at an angle of 6-8°.

* * * * *

UNITED STATES PATENT AND TRADEMARK OFFICE
CERTIFICATE OF CORRECTION

PATENT NO. : 5,171,624
DATED : December 15, 1992
INVENTOR(S) : Helmut Walter

It is certified that error appears in the above-indentified patent and that said Letters Patent is hereby corrected as shown below:

Column 10, line 11, delete "0.25" and insert --0.025--.

Signed and Sealed this

Twelfth Day of July, 1994

Attest:

BRUCE LEHMAN

Attesting Officer     Commissioner of Patents and Trademarks